(12) United States Patent
Carter et al.

(10) Patent No.: US 7,634,522 B1
(45) Date of Patent: Dec. 15, 2009

(54) RANDOM NUMBER GENERATION

(75) Inventors: Stephen R. Carter, Spanish Fork, UT (US); Lloyd Leon Burch, Payson, UT (US)

(73) Assignee: Novell, Inc., Provo, UT (US)

( * ) Notice: Subject to any disclaimer, the term of this patent is extended or adjusted under 35 U.S.C. 154(b) by 932 days.

(21) Appl. No.: 10/999,595

(22) Filed: Nov. 30, 2004

(51) Int. Cl.
G06F 1/02 (2006.01)

(52) U.S. Cl. ..................................... 708/250; 708/255

(58) Field of Classification Search .......... 708/205–256
See application file for complete search history.

(56) References Cited

U.S. PATENT DOCUMENTS

| | | | |
|---|---|---|---|
| 4,513,386 A * | 4/1985 | Glazer | 708/255 |
| 5,434,806 A | 7/1995 | Hofverberg | |
| 5,757,923 A * | 5/1998 | Koopman, Jr. | 380/46 |
| 6,061,702 A * | 5/2000 | Hoffman | 708/251 |
| 6,298,360 B1 | 10/2001 | Muller | |
| 6,324,558 B1 * | 11/2001 | Wilber | 708/255 |
| 6,340,919 B1 | 1/2002 | Hirayama | |
| 6,430,317 B1 | 8/2002 | Krishnamurthy et al. | |
| 6,487,571 B1 | 11/2002 | Voldman | |
| 6,687,721 B1 | 2/2004 | Wells et al. | |
| 6,691,141 B2 | 2/2004 | Schmidt | |
| 6,697,829 B1 | 2/2004 | Shilton | |
| 6,711,342 B2 | 3/2004 | Pavlath et al. | |
| 6,714,995 B2 | 3/2004 | Koch et al. | |
| 6,732,127 B2 | 5/2004 | Karp | |
| 6,745,217 B2 | 6/2004 | Figotin | |
| 6,748,495 B2 | 6/2004 | Rowlands et al. | |
| 6,766,312 B2 | 7/2004 | Landt | |
| 6,771,104 B2 | 8/2004 | Hars | |
| 6,790,143 B2 | 9/2004 | Crumby | |
| 6,795,840 B1 | 9/2004 | Hillermeier et al. | |
| 6,807,553 B2 | 10/2004 | Oerlemans | |
| 6,954,770 B1 * | 10/2005 | Carlson et al. | 708/251 |

OTHER PUBLICATIONS

Comscire, "Design Principles and Testing of the PCQNG 2.0", http://comscire.com/products/pcqng20/, (2003), Web Page.

Hellekalek, Peter, "pLab—Theory and Practice of Random Number Generation", http://random.mat.sbg.ac.at/, (1993-2004),Web Page.

Orion Products, "Random Number Generator", http://randomnumbergenerator.nl/home.html, (No Date Listed), Web Page.

Protego, "SG100 TRNG", http://www.protego.se/sg100_en.htm, (No Date Listed),Web Page.

Random.Org, "Random.org—True Random Number Service", http://www.random.org/, (Since Oct. 1998),Web Page.

Schulman, Andrew E., "Hardware Random Number Generators on Intel Chipsets", http://home.comcast.net/—andrex/hardware-RNG/, (Last Updated May 21, 2004),Web Page.

(Continued)

*Primary Examiner*—Lewis A Bullock, Jr.
*Assistant Examiner*—Michael Yaary
(74) *Attorney, Agent, or Firm*—Schwegman, Lundberg & Woessner, P.A.

(57) ABSTRACT

Methods, devices, and systems provide random number generation. Electrical characteristics of a processing device are sampled for statistically random values. The values are combined to produce random numbers. The random numbers are vended from the processing device for subsequent consumption by applications executing on or interfaced to the processing device.

26 Claims, 4 Drawing Sheets

OTHER PUBLICATIONS

Sci.Crypt Newsgroup, "Hardware Random Bit Generator", http://willware.net:8080/hw-rng.html, (Entries from 1995 & 2000),Web Page.

The Mandala Centre, "Random number generation", http://mandala.co.uk/links/random/, (No Date Listed),Web Page.

* cited by examiner

RANDOM NUMBER GENERATION

FIELD

The invention relates generally to data processing and more particularly to random number generation.

BACKGROUND

Random numbers are pervasively processed within digital electronics. A random number may determine the processing of an application, such as when it the application is associated with gaming. Moreover, a random number may be used as an encryption key for cryptography. Still further, a random number may be used in calculations associated with scientific investigation, such as statistical sampling for a population, etc.

Generally, random numbers are generated by providing a seed value to a random number generator. The random number generator produces a random number in response to the seed value. One area of concern with this process is that the seed value may be discoverable, reproducible, or derivable by an intruder. If an intruder can reproduce the seed value by looking at patterns of random numbers or by using discoverable values to produce the seed value, then the intruder may be able to replicate the random number. Once a random number is successfully reproduced, then the intruder may break keys and other areas of security.

Typical seed values are not truly random. That is, seed values are derived from information that is not random or derived from information that may be subsequently acquired. It is generally assumed that true randomness may only exist in nature; because of the dynamic nature of the environment, there is no given state (e.g., seed) in the environment that can be subsequently reproduced so that a random number may be duplicated.

In fact, randomness is a much sought after concept in digital electronics, because the ability to create true randomness can produce stronger and potentially impenetrable cryptography. However, conventional approaches have failed to use deterministic processing devices (e.g., computers, etc.) to produce true randomness via algorithms which process on those deterministic devices. With conventional approaches, a random number generator is random only if each time the generator is processed it uses a unique and different seed value. Stated another way, if the seeds in two separate devices are the same and the two devices use the same algorithm, then the random numbers generated for the two devices will be the same. Thus, true randomness remains an elusive concept in the digital arts because of the deterministic nature of processing devices and the deterministic information used in algorithms that execute on the processing devices.

Therefore, an improved random number generator and improved random number generation techniques are desirable.

SUMMARY

In various embodiments, a random number is generated by sampling unique electrical characteristics associated with a processing device. The sampled electrical characteristics are translated into portions of a random number and tested to ensure they are statistically random. Next, the portions of the random number are vended from the processing device as complete random numbers when requested. Once vended, the random numbers are removed from the processing device. The complete random numbers are consumed by applications executing on or interfaced to the processing device.

DETAILED DESCRIPTION

As used herein the phrase "processing device" refers to computers, personal computers (PC's), servers, personal digital assistants (PDA's), intelligent appliances, portions of intelligent apparel, phones, biometric devices, gaming devices, or any other device capable of housing a processor which cooperates with memory and/or storage. The processing device may be a standalone device or integrated into other composite devices. Additionally, the processing device may be interfaced over wired or wireless networks to other devices having applications, systems, and/or services.

The processing devices of the embodiments presented herein are equipped with novel hardware, firmware, and/or software that generate novel random numbers. The random numbers are novel because they are produced using characteristics of the processing devices that are not reproducible. Stated another way, the characteristics of the processing devices used to generate the random numbers are ones that are unique to the environments of the processing devices and therefore more closely resemble nature, which is truly random. That is, the characteristics change with time and are specific to a specific processing device at a specific point in time. Thus, the characteristics are not generally capable of being reproduced and exhibit no defined pattern that may render them reproducible.

Some example characteristics that may be used include the power supplies associated with the processing device or other mechanical features associated with the processing device that may degrade or be in different states as time progresses.

For example consider a PC (e.g., processing device) that is powered via an alternating current (AC) power supply and that drives its internal resources (e.g., disk drives, processor, etc.) by drawing from a direct current (DC) power supply, which is established from the AC power supply. Both the AC and DC power supplies have a variety of readings associated with their power, current, and voltage. At any given point in time, these readings may define a unique state or condition of the PC, which is unique and may never be completely reproduced. The unique state reflects external environmental conditions of the PC (namely the AC power supply) and internal environmental conditions of the PC (namely the DC power supply). Some example mechanical features may include readings associated with the processing device's rotations per minute (RPM) for its fan, etc.

The novel techniques for random number generation may be consumed by any application, system, and/or service that utilize random numbers, such as in cryptography, gaming, scientific investigation, etc. The resulting accuracy or security associated with these applications, systems, and/or services will be improved because of improved randomness associated with the random numbers produced by the embodiments presented herein.

Figure 1:
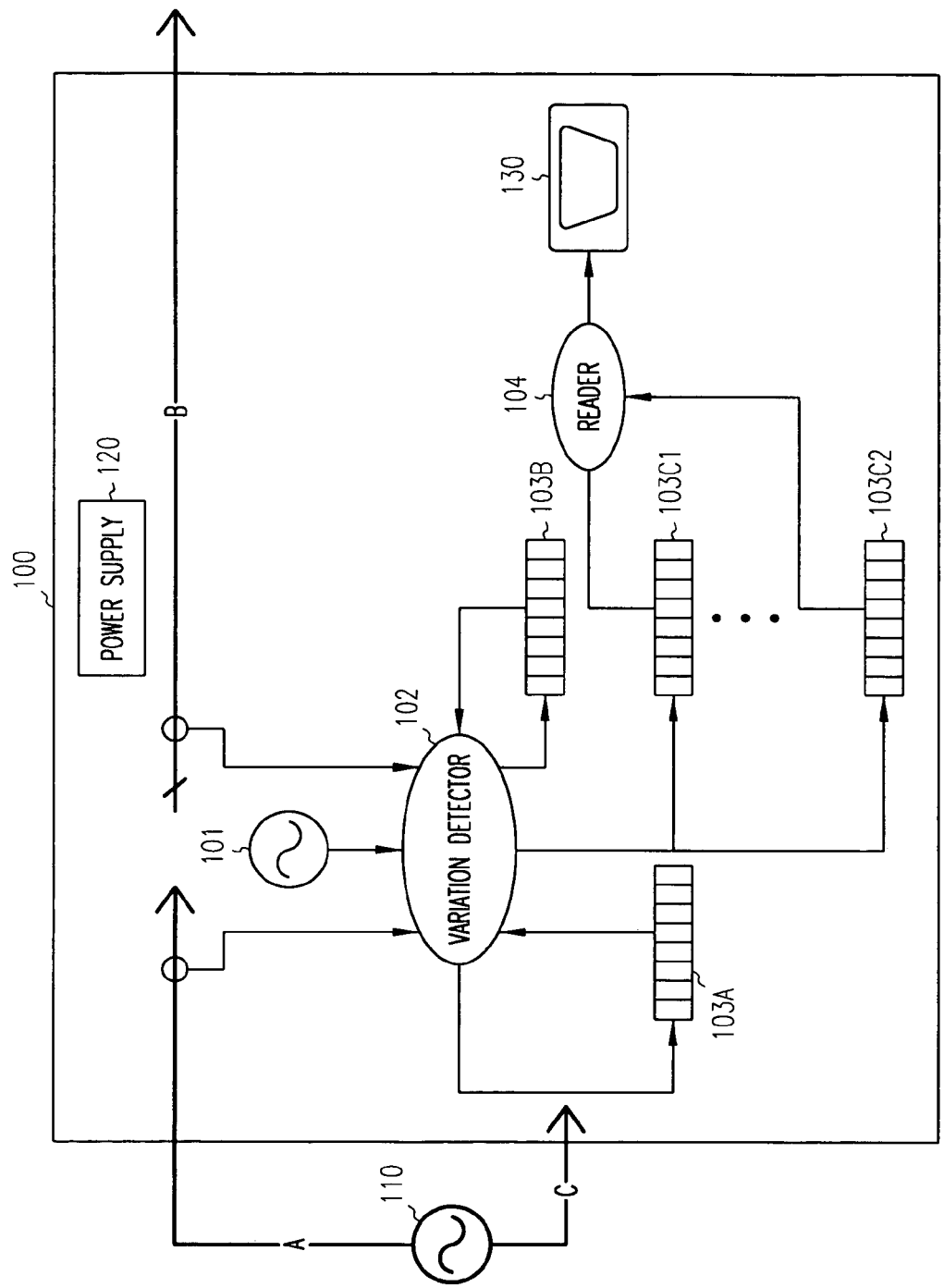
FIG. 1 is a diagram of a processing device having a random number generation feature, according to an example embodiment.

FIG. 1 is a diagram of a processing device 100 having a random number generation feature, according to an example embodiment. The processing device 100 includes electrical components associated with hardware, firmware, and/or software. FIG. 1 is presented for purposes of illustration only, such that the exact architectural layout is not intended to limit embodiments of the invention presented herein.

The processing device 100 may be a PC, a PDA, an intelligent appliance (e.g., television, refrigerator, media player, clock, radio, etc.), a portion of intelligent apparel (e.g., sunglasses, watch, etc.), a phone, a biometric device, navigation device, or any other device equipped with a processor and memory. Furthermore, the processing device 100 may be a standalone device or a device integrated into another composite device. In an embodiment, the processing device 100 is also networked to other applications, services, systems, and/or devices over a network, and the network may be wired, wireless, or a combination or wired and wireless.

The processing device 100 includes a sampling oscillator 101, a variation detector 102, and one or more registers 103. In an embodiment, the processing device also includes a reader 104 and/or an interface 105 to other aspects or components of the processing device 100 or to other devices.

The sampling oscillator 101 includes a connection to the variation detector 102. The sampling detector clocks the variation detector 102. The variation detector 102 includes connections to power supplies associated with the processing device. For example, one power supply is the AC power supply 110 that supplies power to operate the processing device. The AC power supply 110 is externally interfaced to the processing device 100. Another power supply is the DC power 120 that the processing device draws from to power its processor(s), memory, disk heads, and storage.

The variation detector 102 is adapted to monitor the power supplies 110 and 120. The signals produced by the power supplies 110 and 120 are highly variable, since every disk access, memory access, and/or movement of disk heads will cause a fluctuation in the signals associated with the DC power supply 120. Moreover, the sequences of the accesses and/or movements are not practically capable of being subsequently reproduced at some later point in time. Thus, at any given moment in time, when the variation detector 102 acquires sample signals from the power supplies 110 and 120, a unique state is acquired; one that more closely resembles the randomness associated with nature. It is, therefore, highly unlikely that any given sample signal state can be subsequently reproduced at a different point in time. It should also be noted, that the AC power supply 110 is influenced by all other devices that may be connected to an AC grid associated with the AC power supply 110.

A period for acquiring signal samples may be configured into the sampling oscillator 101. The period may be set at predefined intervals or may be random. The sampling oscillator 101 may be a mechanical or an electrical device interfaced to the variation detector 102 and is used to trigger the sampling performed by the variation detector 102.

When activated via the sampling oscillator 101, the variation detector 102 detects the signals A of the AC power 110 feed and B of the DC power 120 draw. The sampling oscillator 101 is activated during a period for sampling. As stated, the period may be configured into the sampling oscillator 101, such as when the sampling oscillator 101 is mechanical. Alternatively, the period may be triggered by firmware and/or software, such as when the sampling oscillator 101 is an electrical device. Further, the period may be preset or may be random.

The variation detector 102 receives triggers from the sampling oscillator, which cause the variation detector 102 to translate the signals A of the AC power 110 and DC power 120 into digital bit sequences within the processing device. The variation detector 102 may also be adapted to determine the upper and lower signal readings associated with the AC power 110 feed and the DC power 120 draw. After a number of iterations or a certain amount of time in operation, the variation detector 102 may be able to deduce or learn the upper and lower bounds associated with readings from the power supplies 110 and 120. The variation detector 102 may also be adapted to weight the bit readings of the signals to ensure that proper deviation from the upper and lower bonds of the power supplies 110 and 120 are maintained. The variation detector 102 may be an electrical component or device embedded within the hardware of the processing device 100. Alternatively, the variation detector 102 may be implemented as a firmware and/or software component executing within the processing device 100.

The variation detector 102, within a given period, evaluates and compares the reading "A" associated with the AC power 110 feed against the reading "B" associated with the DC power 120 draw. The readings are then added, computed against one another, or logically combined and weighted, if desired, to keep them within a proper deviation of the upper and lower bounds for the signal readings. The final value is a bit string. The entire bit string, a portion of the bit string, or a single bit of the bit string is then designated as output by the variation detector 102. The output is then stored in at least one register 103A-103B. The output becomes a portion of a random number that is generated by the processing device 100, as will be described in greater detail below.

In an embodiment, the processing device 100 includes three to four registers 103A-103C2. A first register 103A captures output produced from the variation detector 102 and shifts or pushes it into its memory. In this manner, the contents of the first register 103A includes a string of bit values, some of which may be used to resolve a complete random number and some of which maybe used to resolve a different complete random number during a different iteration of the random number generation produced by the processing device 100. The first register 103A is larger than a second register 103B. The second register 103B also captures output produced by the variation detector 102 in its memory. However, the string value being accumulated in the second register 103B serves as an index value into a memory location of the first register 103A. One way to do this is to use some type of hashing computation that uses modulus, truncation, rounding, etc. for purposes of acquiring a memory location within the first register 103A that is within the bounds of the first register 103A. The third register 103C1 is populated by random numbers extracted from the first register 103A from locations identified by the index value included in the second register 103B. The variation detector 102 may be preconfigured or dynamically configured to define the bit length of a complete random number or the bit length may be deduced from the size of the third register 103C1. Once the variation detector 102 has the index from the second register 103B and the bit length, it extracts the bits from the first register 103A as a complete random number, assuming enough bits exists in the first register 103A to service the bit length. In some embodiments, another fourth register 103C2 may be used to house a pool of non-allocated random numbers.

In an embodiment, the fourth register 103C2 is non volatile memory or storage. This means that when power is lost or interrupted within the processing device 100, that the pool of available and non-allocated random numbers are still available for distribution when power is properly restored. The fourth register 103C2 may also be considered a cache of available and non-allocated random numbers.

A complete random number is provided to a reader 104. The reader 104 is interfaced to an application or device connector interface 130. The interface 130 may be a bus, such as a Universal Serial Bus (USB) connection. When an external application requests a random number, the request is communicated to the reader 104 over the interface 130. The reader 104 then obtains a random number from a register (memory or storage 103C1-103C2) and supplies the random number back to the requestor via the interface 130. Once a random number is acquired from a register 103C1-103C2, that random number is deleted from the register 103C1-103C2. In this manner, any given random number is used once and not recycled or reused and its prior identity is lost and not capable of being reproduced once distributed or allocated to a requestor.

An example scenario is now presented with respect to FIG. 1 for purposes of further illustration of the novel random number generation features of the processing device 100. In FIG. 1, the processing device 100 receives power signals A and B as input that originates from an AC power source 110.

The voltage variation of one of the AC power 110 inputs A is monitored by the variation detector 102 during a period for voltage fluctuations. It should be noted, that even if the AC power 110 signal is regulated or supplied via an uninterruptible power supply (UPS), the signal variation will be enough to produce a highly variable signal reading.

The variation in the voltage will have a defined upper and lower bound which will be used by the variation detector 102 to bias the analogue to digital (AD) converter of the processing device 100 (not shown in FIG. 1) so that the entire range of randomness in the signal may be sampled. An optional mechanism may be implemented within the processing device (not shown in FIG. 1) which would monitor signal A for some period of time to learn or to discover what the upper and lower bounds are.

The output of the DC power 120 supply draw is also monitored by the variation detector 102. This may also include an optional mechanism to learn or to discover the upper and lower bounds of the DC power 120 draw signal B (not shown in FIG. 1). Although a processing device 100, such as a PC, may hold the voltage draw B constant, there will still be voltage variations just as there will be in the AC power feed A. Moreover, even if the voltage does not varying significantly in B, the current will be constantly varying in B. Thus, the variation detector 102 may monitor the current in B to provide a more substantial variation in readings associated with sampling B. It should be noted that during startup of the processing device 100, the current draw will tend toward the upper bound of the signal B and therefore may reduce the entropy of the random numbers produced. This situation can be detected and accounted for as is discussed more completely herein and below.

According to the period of the sampling oscillator 101, the two signals (A and B) are sampled by the variation detector 102. It should be noted that the signals (A and B) may include a variety of information that can be sample, as was alluded to above with the discussion of the current of signal B. The signals (A and B) may be the output voltage, current, and/or voltage at an intermediate stage within the power supplies 110 and 120. The value of each signal's sample may also be weighted by the variation detector 102 and then arithmetically or logically combined to produce a single bit value of 1 or 0. However, since there is an upper and lower bound to the signals being monitored, the variation detector 102 may produce more than a single bit. Thus, although the example presented herein discusses a single bit derivation it is understood that strings of bits may be derived by the variation detector 102. The determined bit value is then shifted into a first register 103A and a second register 103B. The first register 103A is larger in size than the second register 103B.

When a request is received for a random number via the reader 104 from communication occurring with an application, service, device, and/or system over the data connector interface 130 and when there are sufficient bits in the first register 103A, then the following processing is initiated. First, the value of a random number in the first register 103A is evaluated to determine its statistical randomness (e.g., if all the bits in first register 103A are all 1's or all 0's then the value is considered to be non random). If the value is considered statistically random or valid, then the number accumulated in the second register 103B is used as an index (by hashing to a proper memory location of the first register 103A) into the first register 103A and enough bits are taken to fill the memory locations of a third register 103C1. Next, the third register 103C1 is provided the bits, and the contents of the third register 103C1 now represent a complete and new random number. Finally, the first register 103A is shifted to remove all bits used in producing the random number and the contents of the second register 103B are cleared.

If the first register 103A is full or becomes full during automatic processing periods of the sampling oscillator 101 and the variation detector 102 and there are no requests for random numbers, then the process described above may be performed and the random numbers produced during each iteration are moved out of the third register 103C1 and into a fourth register 103C2. The fourth register 103C2 may then be considered a cached pool of available random numbers and may be distributed when requests are received and no random number is immediately available from the first register 103A. Again, in some cases, the fourth register 103C2 may be non-volatile memory or storage; meaning that during power loss or power interruption the pool of random numbers survives and is available when power is restored to the processing device 100. Thus, when the power supply is in a low entropy state, such as during processing device 100 startup a random number may be immediately supplied from the pool of available random numbers housed in the fourth register 103C2.

The processing device 100 utilizes electrical environments associated with the processing device 100 to produce improved randomness. The electrical environments may be externally supplied, such as the AC power feed 110, and may also include internal environments, such as the DC power draw 120. Additionally, a variety of readings may be acquired from the power signals, such as raw power, voltage, current, etc. Other factors may add to the randomness and may be included, such as RPM readings associated with a fan of the processing device 100, and the like.

Additionally, the sampling oscillator 101 does not have to be a highly-accurate source of a regular period. In fact, some random instability in the sampling oscillator 101 within some threshold or delta value is desirable.

The data connector interface 130 may be any conventional interface used in the electrical arts. As mentioned above, one example is a USB connector, since this type of connector interface appears to be universally supported by a wide variety of processing devices.

Figure 2:
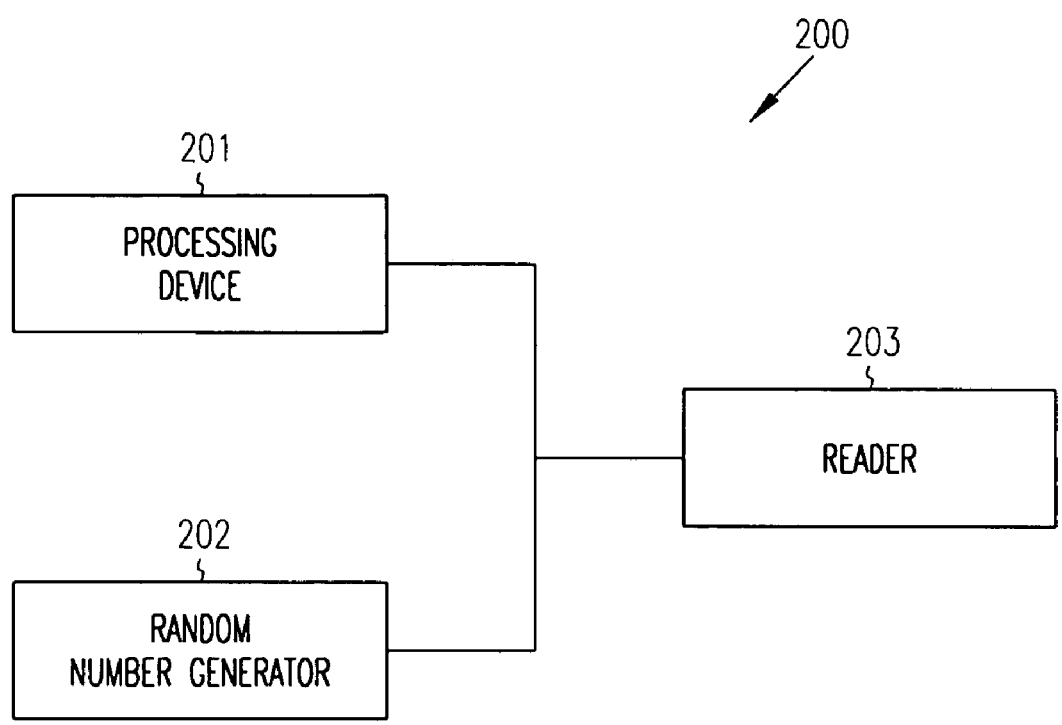
FIG. 2 is a diagram of random number generation system, according to an example embodiment.

FIG. 2 is a diagram of a random number generation system 200. The random number generation system 200 is implemented within machine-readable and accessible media. In an embodiment, the random number generation system 200 is implemented in hardware, firmware, and/or software. The random number generation system 200 presented in FIG. 2 provides an alternative view and perspective of the processing device 100 presented in FIG. 1.

The random number generation system 200 includes a processing device 201 and a random number generator 202. In an embodiment, the random number generation system 200 also includes a reader 203.

The processing device 201 includes one or more processors, memory, and/or storage. The components of the processing device 201 are coupled to one another and communicate with one another. The processing device 201 may be a PC, a server, a phone, a peripheral, a navigation device, a gaming device, a biometric device, an intelligent appliance, a portion of intelligent apparel, a PDA, or any other device having a processor and or memory. Additionally, the processing device 201 may be a standalone device or a device that is integrated into a composite device. Further, the processing device 201 may be interfaced to a network and that network may be wired, wireless, or a combination of wired and wireless.

The random number generator 202 is integrated into or interfaced to the processing device 201. In an embodiment, the random number generator 202 is implemented as a combination of the components identified in FIG. 1's processing device 100. In another embodiment, the random number generator is a physical or logical (software) device that interfaces to the processing device 201.

The random number generator 202 is adapted to sample electrical characteristics of the processing device 201 for purposes of generating random numbers and for purposes of housing the random numbers in the memory or storage associated with the processing device 201. Additionally, the random number generator 202 is adapted to ensure that the random numbers and the electrical characteristics are statistically random before generating or providing the random numbers.

During operation of the random number generation system 200, the random number generator 202 samples electrical characteristics of the processing device, such as voltage, power, and/or current. The electrical characteristics may be associated with external sources (e.g., AC power feed) and with internal sources (e.g., DC power draw). At predefined or random intervals the characteristics are sampled and converted to digital information (e.g., bits).

The bits are evaluated to determine their statistical validity (e.g., ensure within a threshold deviation amount from the upper and lower bounds associated with the characteristics and ensure that not all bits are 1's or all bits are 0's). The bits may be weighted to ensure proper conditions are accounted for (e.g., processing device startup) or to ensure proper deviation from bounds of the characteristics. One or more bits are selected as portions of a random number and the pushed to a first memory and a second memory.

The first memory is larger than the second memory. The first memory houses sets of the one or more bits and the second memory houses an index into the first memory. When sufficient bits exist in the first memory to fill a third memory, then the index of the second memory is used to acquire the sufficient bits from the first memory beginning at a location identified by the index (wrapping can occur within the first memory, such that if the index is at or near the end of the first memory the sufficient size is obtained by wrapping back to the starting location of the first memory). The bit string is then stored in the third memory as a complete random number.

In some embodiments, the random number generator 202 may also accumulate a pool of available random numbers in a fourth memory or cache. When random numbers are allocated or distributed they are removed from the third and/or fourth memories.

The reader 203 is adapted to interface to devices or applications communicating with or processing on the processing device 201. The reader 203 receives requests from applications or devices to acquire a random number. In response to this the reader 203 contacts the random number generator 202. The random number generator 203 then delivers a random number from one of the memories discussed above. The reader 203 then communicates the random number to the requesting application or device.

Applications consume the random numbers. These applications may be executing on the processing device 201 or a different processing device that communicates with the processing device 201 of FIG. 2. In an embodiment, at least one application that consumes the random numbers is a cryptographic application that uses the random numbers to generate keys. For example, a cryptographic application may use a random number to generate a public key as part of a private-public key pair, the public key may then be communicated to another resource or application for use in securely communicating with the cryptographic application or another application that enlisted the services of the cryptographic application.

In other embodiments, an application that consumes the random numbers may be a gaming application. For example, a slot machine that produces a win scenario for a player based on chance and randomness. In still other embodiments, the application may be a scientific investigation application. For example, political polling or statistical sampling may use random numbers to randomly select its population for study.

Figure 3:
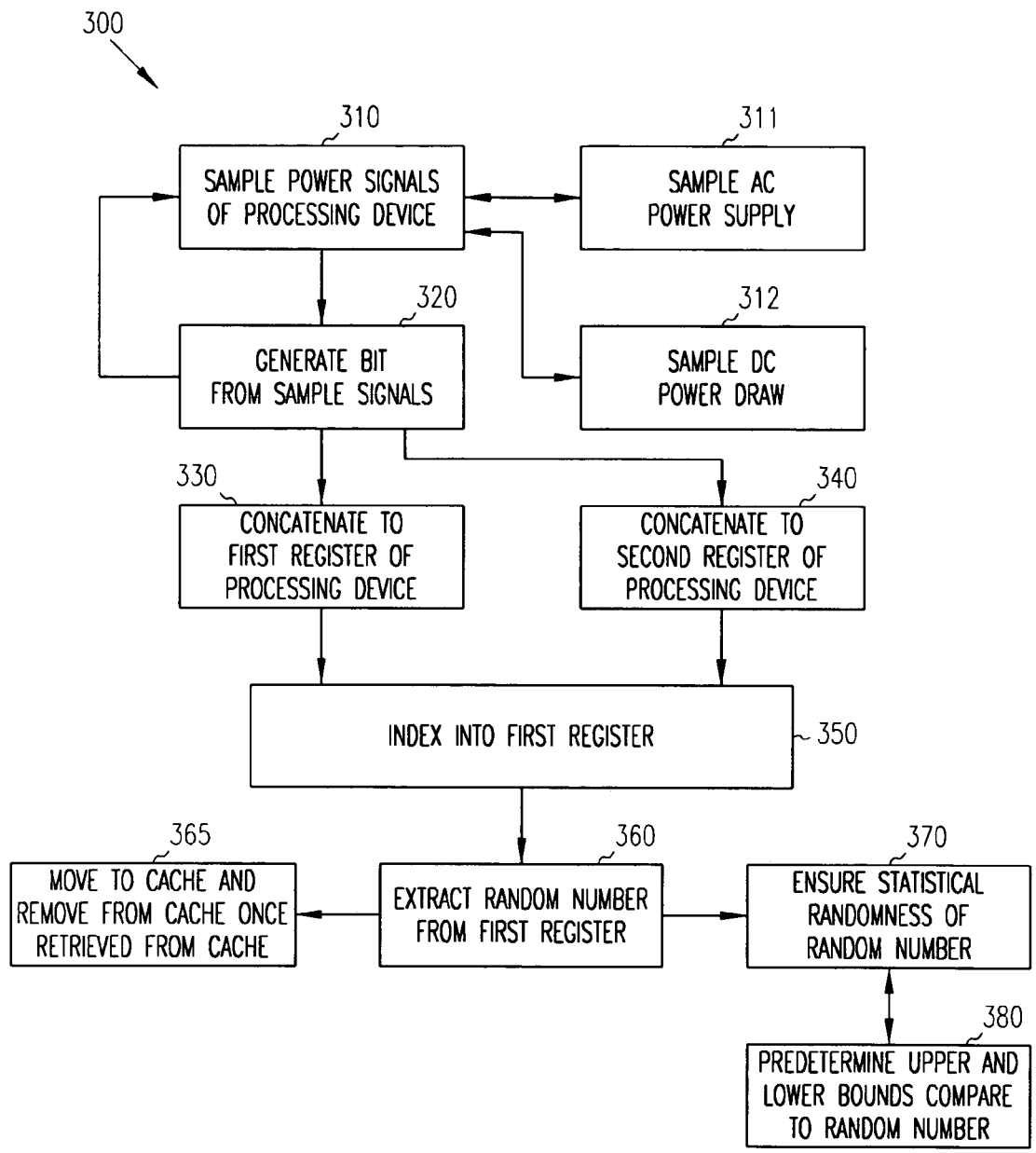
FIG. 3 is a diagram of a method for generating a random number, according to an example embodiment.

FIG. 3 is a diagram of a flowchart for a method 300 that generates a random number, according to an example embodiment. The method 300 (hereinafter "random number service") is implemented in a machine-accessible and readable medium and is optionally accessible over a network. In an embodiment, the random number service is implemented within the components of the processing device 100 of FIG. 1 or the random number generation system 200 of FIG. 2. Of course, it is understood that the random number service may be implemented within any architectural arrangement, hardware component, firmware/software component, and/or combinations of the same.

Initially, the random number service samples, at 310, power signals of a processing device. The power signals may include information related to power, voltage, current, etc. which are associated with the processing device. In an embodiment, the signals may also be augmented with other information, such as RPM readings for a fan of the processing device and the like.

In an embodiment, the power signals are sampled from an AC power supply feed, at 311, and from a DC power supply draw, at 312. The sampling of the AC power produces a first value that is converted from analogue to digital format, and the sampling of the DC power produces a second value that is converted from analogue to digital format. These values are evaluated and combined in the manners discussed below.

At 320, the random number service generates a bit from the sample signals. That is, the readings from the signals are combined to produce a value and that value is abstracted to a bit value of 0 or a bit value of 1. In an embodiment, the first and second values produced at 311 and 312 are combined and weighted based on a first upper and lower bound associated with the AC power and a second upper and lower bound associated with the DC power. The weights are used to ensure that the readings acquired in the translated first and second values fall within a proper deviation threshold in order to ensure a high degree of randomness.

Once the bit is derived or generated, the bit, at 330, is pushed into a first register of the processing device, and simultaneously, at 340, pushed into a second register of the processing device. The first register is larger than the second register and accumulates bits; subsets of these bits represent complete values for random numbers. The size of the subsets may be preconfigured within the processing logic of the random number service or preconfigured into the firmware of the processing device. When a particular subset of bits is used as an instance of a complete random number, these bits are shifted out of the first register.

The second register accumulates bits as an index value. The index value provides an offset into the first register for purposes of acquiring an initial starting location for extracting a subset of bits as an instance of a random number. The index value may be mapped to the range of acceptable locations included within the first register. This may be achieved using a hashing function that deploys modulus operations, rounding, truncation, etc.

Moreover, the random number service performs wrapping within the first register to acquire a subset of bits as an instance of a complete random number, such that if the size of the subset of bits beginning at the index location reaches the end of the first memory the remaining bits needed are obtained by wrapping back around to the starting or first locations of the first memory.

When the first register has a sufficient amount of bits to produce an instance of a random number, then the random number service, at 350, acquires the index value in the second register and indexes into the first register. At 365, the bits are extracted from the first register. The extracted bits represent an instance of a complete random number. In an embodiment, at 365, the complete random number may be stored in a third register or stored in a cache or pool of available random numbers within the processing device. When a random number is requested and distributed from the third register or the cache it is removed from the processing device. This ensures, that the distributed random number will not be reused and will not be subsequently acquired or reproduced and provides an added degree of randomness.

In an embodiment, at 370, the extracted random number may also be checked to ensure that it is statistically random. In other words, to ensure that not all the bits of the random number are all 0's or all 1's.

In still another embodiment, at 380, the random number service may predetermine upper and lower bounds for the signals or the random numbers and compare the random number to the bounds to ensure a proper deviation is represented in the random number.

The processing depicted at 310 and 320 may be iterated for a predefined number of iterations for purposes of acquiring a complete random number. The number of iterations may be defined as a processing parameter to the random number service or derived from the random number service based on attributes of components of the processing device, such as the size of a register that is being used to house a complete random number. Moreover, the sampling period of 310 may be predefined or random, as was discussed above with respect to FIG. 1.

The random number service generates a random number having a high degree of randomness. This is achieved by using input associated with the electrical environment (both internal and external) of the processing device that processes the random number service. Thus, any given sample period represents a state of the processing device's electrical environment which is not practically capable of being reproduced. That is, the state is dependent upon time and as time progresses the state may not practically be reproduced. This more closely resembles the randomness of nature and produces novel random numbers. The random numbers may be subsequently consumed by a variety of applications and devices, such as cryptographic applications, gaming devices or applications, scientific applications, and the like.

Figure 4:
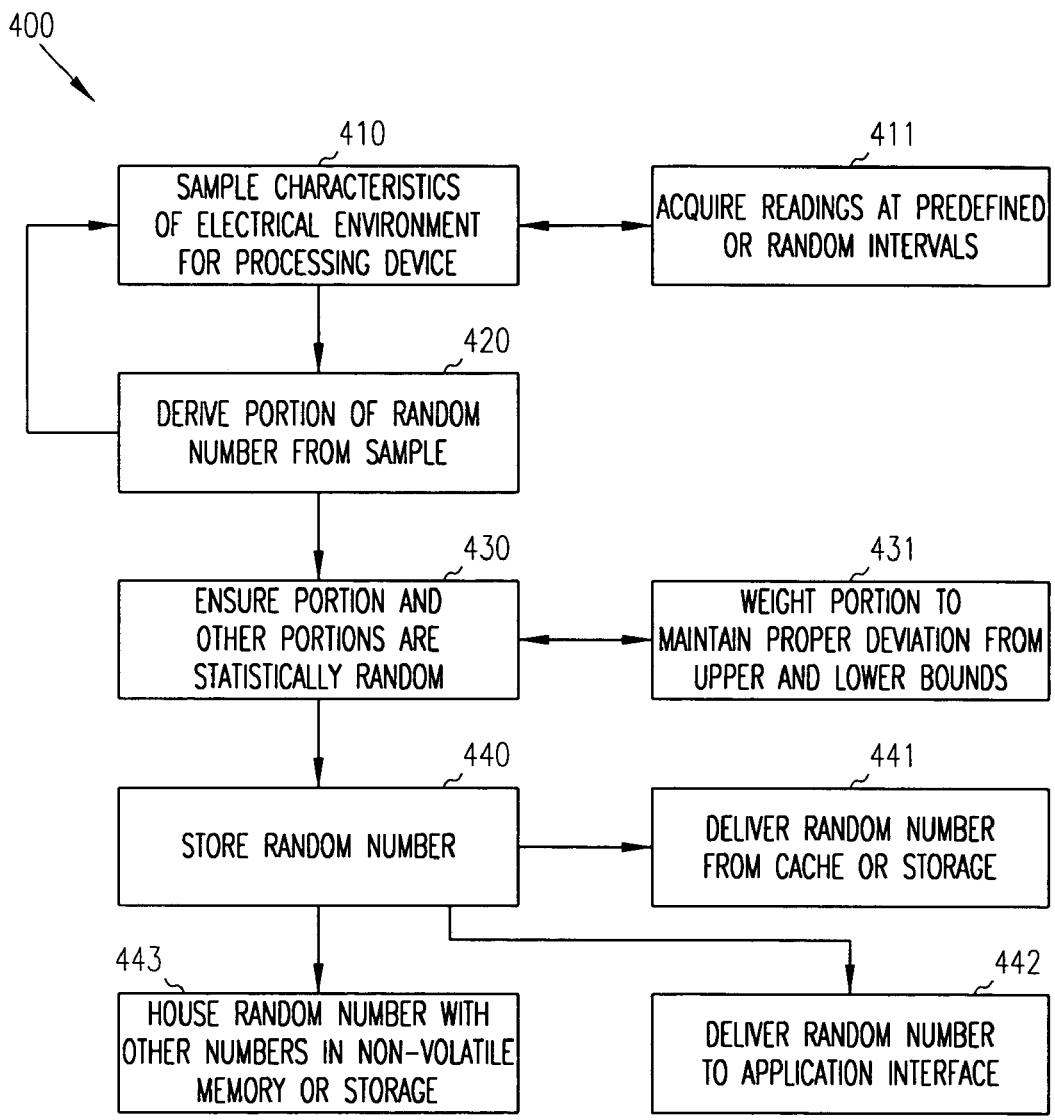
FIG. 4 is a diagram of another method for generating a random number, according to an example embodiment.

FIG. 4 is a flowchart of another method 400 for generating a random number, according to an example embodiment. The method 400 (hereinafter "random service") is implemented in a machine-accessible or readable medium and is optionally accessible over a network. The random service provides an alternative processing configuration to what was described above with respect to the method 300 of FIG. 3. Moreover, the random service may be implemented in hardware, firmware, software, or combinations of the same.

At 410, the random service samples selective characteristics of an electrical environment for a processing device. The characteristics may be obtained from internal sources of the processing device and/or external sources of the processing device. An example external source is an AC power feed and an example internal source is a DC power draw.

The characteristics are derived from signals, such as analogue signals associated with power or device frequencies. The signals can include a variety of characteristics, such as RPM readings, current readings, voltage readings, power readings, etc. The random service selectively samples characteristics in order to ensure a proper degree of randomness. As an example, the current reading may be used for a DC power draw signal whereas the voltage fluctuation may be used for an AC power feed signal. In this manner, the random service selectively samples characteristics of an electrical environment for a processing device.

At 411, the random service may acquire readings for the sampled characteristics at predefined, regular, or random intervals or periods. The interval or period may be provided as a processing parameter to the random service or may be derived from the random service based on attributes associated with the components of the processing device that detect and communicate the readings to the random service.

At 420, the random service derives a portion of a random number from the sampled readings. This may be achieved by adding or logically combining readings from a variety of sources (external and internal power supplies) and then selecting a bit or subset of bits for the combined value as a portion of the random number.

At 430, the random service, optionally, ensures that the portion derived at 420 and other accumulated portions of the random number are statistically random. As an example, the upper and lower bounds of the characteristic readings may be determined or learned by the random service and used to ensure that the random number deviates by a sufficient threshold amount from the upper and lower bounds to ensure a high degree of randomness. One technique for achieving this is to weight, at 431, the portion or other portions to maintain a proper amount of deviation in the random number.

The random service stores a complete random number at 440. The complete random number may be subsequently delivered, at 441, from a cache, memory, register, or storage to a requestor. In another embodiment, at 442, the random number may be delivered to an application interface associated with an application that requested a random number instance. In yet another embodiment, at 443, the random number may be housed with other random numbers within a pool of available random numbers in a non-volatile memory or storage.

A variety of architectural configurations and hardware components were presented with the embodiments of this invention. These were presented for purposes of illustration and are not intended to limit embodiments presented herein. That is, other configurations or components may be used and fall within the scope of this invention, if these other configurations and components utilize the sampling of an electrical environment of processing devices for purposes of deriving a highly random number.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. § 1.72 (b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method implemented in a processing device having a processor that executes the method for:
    sampling power signals of the processing device, the power signals include information for power, voltage, and current for the processing device, and the power signals include rotations per minute readings for a fan of the processing device, and the power signals are sampled from an alternating current power supply feed and a direct current power supply draw, wherein the power signals are produced by the alternating current and direct current power supplies and are variable signals that vary in response to disk access, memory access, and movement of disk heads;
        wherein sampling further includes sampling a first alternating current (AC) or a first voltage from a power supply of the processing device to acquire a first value; and sampling a second direct current (DC) or second voltage from a power supply drawn from the processing device to acquire a second value;
    generating a bit from the power signals, wherein generating further includes combining the first and second value to derive bit, wherein the first and second values are logically combined and weighted based on a first upper and lower bound for the AC power supply relative to the first value and second upper and lower bound for the DC power supply relative to the second value; and
    concatenating the bit into a first register of the processing device, wherein the concatenated bit in the first register forms a portion of a random number.

2. The method of claim 1 further comprising, iterating the method for a predefined number of iterations.

3. The method of claim 1 further comprising, moving a complete random number to a cache of available random numbers.

4. The method of claim 3 further comprising, removing a number of the random numbers from the cache once retrieved from the cache.

5. The method of claim 1, wherein concatenating further includes:
    using an index acquired from a second register into the first register and performing a rounding, truncation, or modulus operation on the index to acquire a location with an available range of locations within the first register to acquire a complete random number;
    extracting the complete random number from the first register beginning at the location and continuing for a predefined length and storing the random number in a third register for subsequent consumption; and
    ensuring that the complete random number is of sufficient size and statistically random.

6. The method of claim 1 further comprising, pre-determining upper and lower bounds for values associated with the power signals and ensuring that the sampling includes a set of the values that varies between the upper and lower bounds by at least a threshold amount.

7. A method implemented in a processing device having a processor that executes the method for:
    sampling selective characteristics of an electrical environment for the processing device to derive a portion of a random number the selective characteristics are obtained from an external source of the processing device via an alternating current (AC) power supply and in internal source of the processing device via a direct current (DC) power draw, a current reading is obtained for the selective characteristics from the DC power draw and a voltage fluctuation is obtained from the selective characteristics from the AC power supply, wherein the selective characteristics are power signals that are produced by the AC power supply and the DC power draw and are variable signals that vary in response to disk access, memory access, and movement of disk heads;
        wherein sampling selective characteristics further includes sampling a first alternating current (AC) or a first voltage from a power supply of the processing device to acquire a first value; and sampling a second direct current (DC) or second voltage from a power supply drawn from the processing device to acquire a second value; and combining the first and second value to derive bit, wherein the first and second values are logically combined and weighted based on a first upper and lower bound for the AC power supply relative to the first value and second upper and lower bound for the DC power supply relative to the second value;
    ensuring the portion and other portions of the random number are statistically random; and
    storing the random number in the processing device.

8. The method of claim 7 wherein sampling further includes, acquiring readings at predefined or random intervals for power supplies being received from and drawn by the processing device, wherein the selective characteristics of the electrical environment are values obtained from electrical characteristics of the power supplies, and wherein the electrical characteristics include at least one of voltage readings, power readings, and current readings.

9. The method of claim 7, wherein ensuring further includes weighting the portion of the random number so that the portion deviates from upper and lower bounds of the selective characteristics by at least a threshold amount.

10. The method of claim 7 further comprising, delivering the random number from a cache or storage of the processing device.

11. The method of claim 7 further comprising, delivering the random number to an application interface interfaced to the processing device.

12. The method of claim 7, wherein storing further includes housing the random number with a plurality of previously generated random numbers in a non-volatile storage or memory associated with the processing device.

13. A processing device having a processor to execute components of the processing device, comprising:
   a variation detector to execute in the processor and adapted to generate a portion of a random number from characteristics and to house the portion in at least one register associated with the processing device, wherein the variation detector is adapted to sample the characteristics from power supplies associated with the processing device, the power supplies include a first power supply for alternating current (AC) power and a second power supply for direct current (DC) power, the variation detector acquires readings as the characteristics from the first and second power supplies and the readings are logically combined with one another as the portion of the random number, wherein the characteristics are produced by the AC power and the DC power and are variable signals that vary in response to disk access, memory access, and movement of disk heads;
   wherein the device further includes sampling a first alternating current (AC) or a first voltage from a power supply of the processing device to acquire a first value; and sampling a second direct current (DC) or second voltage from a power supply drawn from the processing device to acquire a second value; combining the first and second value to derive bit, wherein the first and second values are logically combined and weighted based on a first upper and lower bound for the AC power supply relative to the first value and second upper and lower bound for the DC power supply relative to the second value; and
   a sampling oscillator to execute in the processor and adapted to trigger the variation detector to sample the characteristics.

14. The processing device of claim 13, further comprising a reader adapted to acquire a complete random number from the at least one register.

15. The processing device of claim 14, wherein the reader is further adapted to provide the complete random number to an application interface executing on the processing device via a bus connection.

16. The processing device of claim 13, wherein the variation detector is at least one of an electrical component of the processing device, a firmware component of the processing device, and a software component of the processing device.

17. The processing device of claim 13, wherein the at least one register further includes:
   a first register adapted to house a complete random number and other portions of other random numbers;
   a second register adapted to house an index into the first register for extracting the complete random number; and
   a third register adapted to house the complete random number extracted from the first register via the index obtained from the second register.

18. The processing device of claim 17, wherein the third register is further adapted to house the complete random number and a plurality of additional random numbers and wherein the third register is non-volatile memory.

19. A system implemented in a processing device having a processor, comprising:
   the processing device; and
   a random number generator integrated into the processing device and to execute in the processor, wherein the random number generator is adapted to sample electrical characteristics of the processing device to generate random numbers and adapted to house the random numbers in memory or storage associated with the processing device, the sample electrical characteristics include voltage, power, and current readings acquired from an external alternating current (AC) power feed and acquired from an internal direct current (DC) power draw, wherein the electrical characteristics are produced by the AC power feed and the DC power draw supplies and are variable signals that vary in response to disk access, memory access, and movement of disk heads;
   wherein sampling electrical characteristics further includes sampling a first alternating current (AC) or a first voltage from a power supply of the processing device to acquire a first value; and sampling a second direct current (DC) or second voltage from a power supply drawn from the processing device to acquire a second value; and combining the first and second value to derive bit, wherein the first and second values are logically combined and weighted based on a first upper and lower bound for the AC power supply relative to the first value and second upper and lower bound for the DC power supply relative to the second value.

20. The system of claim 19 further comprising, a reader integrated into the processing device and adapted to acquire selective random numbers from the memory or the storage, and wherein the selective random numbers are removed from the memory or the storage when acquired by the reader.

21. The system of claim 19, wherein the random number generator is adapted to ensure that the random numbers and the electrical characteristics are statistically random before generating the random numbers.

22. The system of claim 19, wherein the random number generator is implemented within the processing device as at least one of hardware, firmware, and software.

23. The system of claim 19, wherein the processing device is at least one of a computer, a gaming device, a peripheral, a personal digital assistant, a phone, an intelligent appliance, a portion of an intelligent apparel, and a biometric device.

24. The system of claim 19, wherein the random numbers are consumed by applications executing on or interfaced to the processing device.

25. The system of claim 24, wherein at least one of the applications is a cryptographic application that consumes the random numbers to generate keys.

26. The system of claim 24, wherein the applications include at least one of a gaming application and scientific investigation application.

* * * * *

UNITED STATES PATENT AND TRADEMARK OFFICE
CERTIFICATE OF CORRECTION

PATENT NO. : 7,634,522 B1  Page 1 of 1
APPLICATION NO. : 10/999595
DATED : December 15, 2009
INVENTOR(S) : Carter et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1203 days.

Signed and Sealed this

Twenty-first Day of December, 2010

David J. Kappos
*Director of the United States Patent and Trademark Office*